United States Patent
Choi et al.

(10) Patent No.: US 8,588,186 B1
(45) Date of Patent: Nov. 19, 2013

(54) AUTOMATIC OVERRIDE OF POWER CONTROL PARAMETERS FOR WIMAX MOBILE STATIONS

(75) Inventors: Jihwan P. Choi, San Jose, CA (US); Jiwon S. Han, San Ramon, CA (US)

(73) Assignee: Marvell International Ltd., Hamilton (BM)

(*) Notice: Subject to any disclaimer, the term of this patent is extended or adjusted under 35 U.S.C. 154(b) by 1085 days.

(21) Appl. No.: 12/569,072

(22) Filed: Sep. 29, 2009

Related U.S. Application Data

(60) Provisional application No. 61/104,498, filed on Oct. 10, 2008.

(51) Int. Cl.
  *G08C 17/00* (2006.01)
  *H04W 4/00* (2009.01)

(52) U.S. Cl.
  USPC ........... 370/333; 370/311; 370/328; 370/331; 370/338

(58) Field of Classification Search
  USPC ........................................................ 370/333
  See application file for complete search history.

(56) References Cited

U.S. PATENT DOCUMENTS

| | | | |
|---|---|---|---|
| 2006/0234642 A1* | 10/2006 | Baum et al. | 455/69 |
| 2008/0159192 A1* | 7/2008 | Lee et al. | 370/310 |
| 2008/0165723 A1* | 7/2008 | Kim | 370/331 |
| 2008/0240217 A1* | 10/2008 | Lee et al. | 375/227 |
| 2009/0003467 A1* | 1/2009 | Chen | 375/260 |
| 2009/0154392 A1* | 6/2009 | Park et al. | 370/328 |
| 2009/0213961 A1* | 8/2009 | Park et al. | 455/69 |

OTHER PUBLICATIONS

IEEE Std 802.16-2004 (Revision of IEEE Std 802.16-2001) IEEE Standard for Local and metropolitan area networks; Part 16: Air Interface for Fixed Broadband Wireless Access Systems; IEEE Computer Society and the IEEE Microwave Theory and Techniques Society; Oct. 1, 2004; 893 pages.

IEEE Std 802.16e™—2005 and IEEE Std 802.16TM—2004/Cor1-2005 (Amendment and Corregendum to IEEE Std 802.16-2004); IEEE Standard for Local and metropolitan area networks; Part 16: Air Interface for Fixed and Mobile Wireless Access Systems; Amendment 2: Physical and Medium Access Control Layers for Combined Fixed and Mobile Operation in Licensed Bands and Corrigendum 1; IEEE Computer Society and the IEEE Microwave Theory and Techniques Society; Feb. 28, 2006; 864 pages.

IEEE Std 802.16e™—2009 (Revision of IEEE Std 802.16-2004); IEEE Standard for Local and metropolitan area networks; Part 16: Air Interface for Broadband Wireless Access Systems; IEEE Computer Society and the IEEE Microwave Theory and Techniques Society; May 29, 2009; 2082 pages.

\* cited by examiner

*Primary Examiner* — Ian N Moore
*Assistant Examiner* — Jenee Alexander

(57) ABSTRACT

Methods for a wireless transceiver, the methods having corresponding apparatus and computer programs, comprise: transmitting a ranging sequence modulated according to a first modulation mode at a power level selected according to a normalized carrier-to-noise value associated with the first modulation mode as set forth in a table associating normalized carrier-to-noise values with modulation modes; transmitting a first ranging request message according to a second modulation mode at a power level selected according to a normalized carrier-to-noise value associated with the second modulation mode, the first ranging request message being transmitted after having received a ranging response message for the ranging sequence; and increasing each normalized carrier-to-noise value in the table, except the normalized carrier-to-noise value associated with the first modulation mode, by a predetermined amount in response to the transceiver not receiving a response to the first ranging request message within a predetermined interval.

16 Claims, 4 Drawing Sheets

AUTOMATIC OVERRIDE OF POWER CONTROL PARAMETERS FOR WIMAX MOBILE STATIONS

CROSS-REFERENCE TO RELATED APPLICATIONS

This application claims the benefit of U.S. Provisional Patent Application Ser. No. 61/104,498, filed on Oct. 10, 2008, the disclosure thereof incorporated by reference herein in its entirety.

FIELD

The present disclosure relates generally to the field of wireless networks, more particularly to wireless networks implementing the WiMAX protocol, and still more particularly to power control for WiMAX mobile stations.

BACKGROUND

Many modern mobile devices such as smartphones contain processors with speeds exceeding 600 MHz, and it is contemplated that future generation products will be even faster, and will have even more processing capabilities. In order to fully utilize the processing capabilities of such a device, certain applications need to send and receive large amounts of data over a wireless network. In order to maximize both the mobility of the device and the processing capabilities of the device, the wireless network should have both a large range and a high data transfer rate. One common solution used in the art is to have the device connect to a cellular phone network such as CDMA, GSM, GPRS, or EDGE, or to a wireless network such as a WiFi network. Both these solutions, however, have limitations. Cellular phone networks do not provide a high enough data transfer rate to run certain applications, and WiFi networks have limited ranges (typically less than 200 meters), significantly limiting the mobility of a device.

In light of the shortcomings of the aforementioned network architectures, a new wireless network protocol called Worldwide Interoperability for Microwave Access or "WiMAX" has emerged. WiMAX has a range comparable to cellular phone networks and data transfer rates comparable to WiFi networks. The base stations in a WiMAX network can frequently transmit data over a greater than 10-mile radius. For all transmissions, the IEEE 802.16 standard governing the WiMAX protocol dictates that the mobile station employ relative transmit power levels selected according to a normalized carrier-to-noise (C/N) modulation table, shown in Table 1 below. Referring to Table 1, a normalized C/N value is specified and used relatively for each combination of modulation mode and forward error correction (FEC) rate. That is, the absolute transmit power levels are selected according to the differences between the normalized C/N values shown in Table 1.

TABLE 1

| Modulation/FEC rate | Normalized C/N (dB) |
| --- | --- |
| ACK region | −3 |
| Fast-feedback | 0 |
| Ranging region | 3 |
| QPSK 1/3 | 0.5 |
| QPSK 1/2 | 6 |
| QPSK 2/3 | 7.5 |
| QPSK 3/4 | 9 |
| Sounding | 9 |

TABLE 1-continued

| Modulation/FEC rate | Normalized C/N (dB) |
| --- | --- |
| 16-QAM 1/2 | 12 |
| 16-QAM 2/3 | 14.5 |
| 16-QAM 3/4 | 15 |
| 16-QAM 5/6 | 17.5 |
| 64-QAM 1/2 | 18 |
| 64-QAM 2/3 | 20 |
| 64-QAM 3/4 | 21 |
| 64-QAM 5/6 | 23 |

FIG. 1 shows a prior art process 100 for a mobile device to establish an initial connection with a WiMAX base station. The WiMAX base station transmits a broadcast message containing information identifying the base station and other network information. After scanning downlink channels and detecting the broadcast message (step 102), the mobile device transmits a known sequence called a ranging sequence to the WiMAX base station (step 104). The mobile device generally transmits the ranging sequence at some power level and stores that power level for future reference.

The base station responds with an anonymous ranging response message. After receiving the anonymous ranging response message (step 106), the mobile device can transmit a ranging request message (step 108). The mobile device generally transmits the ranging request message at a power level selected according to the "QPSK ½" entry in Table 1, which specifies a C/N value of 6 dB, which is 3 dB higher than the value of the "Ranging region" entry. In response, the base station transmits a ranging response message with basic channel identifier (CID). If the mobile device receives the ranging response message with basic CID (step 110), then the mobile device can begin exchanging regular traffic according to the modulation modes and C/N values of Table 1 (step 112). However, if the mobile device does not receive the ranging response message with basic CID within a specified interval (step 110), the mobile device transmits the ranging sequence again (step 104). After a predetermined number of attempts with no response (step 114) the mobile station returns to scanning downlink channels (step 102). One disadvantage of these approaches is long network entry times due to repeated unsuccessful ranging attempts.

An alternative approach is to allow the mobile device to increase transmission power by more than 3 dB (which is the difference between the "QPSK ½" and "Ranging region" entries in Table 1) when transmitting the ranging request message. This approach is specified in the IEEE 802.16 standard governing the WiMAX protocol. In addition, this increased power level is not used for subsequent messages such as regular traffic. One disadvantage of this approach is that a mobile device may be able to establish an initial connection with a base station, but with subsequent messages at the insufficient transmit power level, leading to a frustrating user experience.

SUMMARY

In general, in one aspect, an embodiment features a method for a wireless transceiver, the method comprising: transmitting a ranging sequence modulated according to a first modulation mode, the ranging sequence being transmitted at a power level selected according to a normalized carrier-to-noise value associated with the first modulation mode as set forth in a table associating a respective normalized carrier-to-noise value with each of a plurality of modulation modes; transmitting a first ranging request message according to a second modulation mode at a power level selected according to a normalized carrier-to-noise value associated with the second modulation mode as set forth in the table, the first ranging request message being transmitted after having received a ranging response message for the ranging sequence; and increasing each normalized carrier-to-noise value in the table, except the normalized carrier-to-noise value associated with the first modulation mode, by a predetermined amount in response to the transceiver not receiving a response to the first ranging request message within a predetermined interval subsequent to the transmitting of the first ranging request message.

Embodiments of the method can include one or more of the following features. Some embodiments comprise transmitting subsequent messages at power levels selected according to respective normalized carrier-to-noise values associated by the table with the respective modulation modes used to transmit the subsequent messages. In some embodiments, transmitting subsequent messages at power levels selected according to respective normalized carrier-to-noise values associated by the table with the respective modulation modes used to transmit the subsequent messages comprises: transmitting a second ranging request message according to the second modulation mode at a power level selected according to the normalized carrier-to-noise value associated with the second modulation mode as set forth in the table. Some embodiments comprise selecting the predetermined amount based on at least one of a function of previous power levels, and a link budget. In some embodiments, the first modulation mode is code division multiple access (CDMA); and the second modulation mode is quadrature phase-shift keying (QPSK). In some embodiments, the method is otherwise compliant with all or part of IEEE standard 802.16, including draft and approved amendments.

In general, in one aspect, an embodiment features an apparatus comprising: a storage module to store a respective normalized carrier-to-noise value for each of a plurality of modulation modes: a mode select module to select a first modulation mode; a power level select module to select a first power level according to the respective carrier-to-noise value stored in the storage module for the first modulation mode; a transmitter to transmit a ranging sequence modulated according to the first modulation mode at the first power level; a receiver to receive a ranging response message for the ranging sequence; wherein, in response to the ranging response message, the mode select module selects a second modulation mode, the power level select module selects a second power level according to the respective carrier-to-noise value stored in the storage module for the second modulation mode, and the transmitter transmits a first ranging request message according to the second modulation mode at the second power level; and an override module to increase each of the normalized carrier-to-noise values stored in the storage module, except the normalized carrier-to-noise value for the first modulation mode, by a predetermined amount in response to the receiver not receiving a response to the ranging request message within a predetermined interval subsequent to the transmitter transmitting the ranging request message.

Embodiments of the apparatus can include one or more of the following features. In some embodiments, the transmitter transmits subsequent messages at power levels selected according to the respective normalized carrier-to-noise values stored in the storage module for the respective modulation modes used to transmit the subsequent messages. In some embodiments, the transmitter transmits a second ranging request message according to the second modulation mode at a power level selected according to the normalized carrier-to-noise value stored in the storage module for the second modulation mode. Some embodiments comprise a delta module to select the predetermined amount based on at least one of a function of previous power levels, and a link budget. In some embodiments, the first modulation mode is code division multiple access (CDMA); and the second modulation mode is quadrature phase-shift keying (QPSK). In some embodiments, the apparatus is otherwise compliant with all or part of IEEE standard 802.16, including draft and approved amendments. Some embodiments comprise a wireless transceiver comprising the apparatus. Some embodiments comprise a mobile device comprising the wireless transceiver. In some embodiments, the mobile device is otherwise compliant with all or part of IEEE standard 802.16, including draft and approved amendments.

In general, in one aspect, an embodiment features a computer program for a wireless transceiver, wherein the computer program comprises: instructions for causing the wireless transceiver to transmit a ranging sequence modulated according to a first modulation mode, the ranging sequence being transmitted at a power level selected according to a normalized carrier-to-noise value associated with the first modulation mode as set forth in a table associating a respective normalized carrier-to-noise value with each of a plurality of modulation modes; instructions for causing the wireless transceiver to transmit a first ranging request message according to a second modulation mode at a power level selected according to a normalized carrier-to-noise value associated with the second modulation mode as set forth in the table, the first ranging request message being transmitted after having received a ranging response message for the ranging sequence; and instructions for increasing each normalized carrier-to-noise value in the table, except the normalized carrier-to-noise value associated with the first modulation mode, by a predetermined amount in response to the transceiver not receiving a response to the first ranging request message within a predetermined interval subsequent to the transmitting of the first ranging request message.

Embodiments of the computer program can include one or more of the following features. Some embodiments comprise instructions for causing the wireless transceiver to transmit subsequent messages at power levels selected according to respective normalized carrier-to-noise values associated by the table with the respective modulation modes used to transmit the subsequent messages. In some embodiments, the instructions for causing the wireless transceiver to transmit subsequent messages at power levels selected according to respective normalized carrier-to-noise values associated by the table with the respective modulation modes used to transmit the subsequent messages comprise: instructions for causing the wireless transceiver to transmit a second ranging request message according to the second modulation mode at a power level selected according to the normalized carrier-to-noise value associated with the second modulation mode as set forth in the table. Some embodiments comprise instructions for selecting the predetermined amount based on at least one of a function of previous power levels, and a link budget. In some embodiments, the computer program is otherwise compliant with all or part of IEEE standard 802.16, including draft and approved amendments.

The details of one or more implementations are set forth in the accompanying drawings and the description below. Other features will be apparent from the description and drawings, and from the claims.

Figure 1:
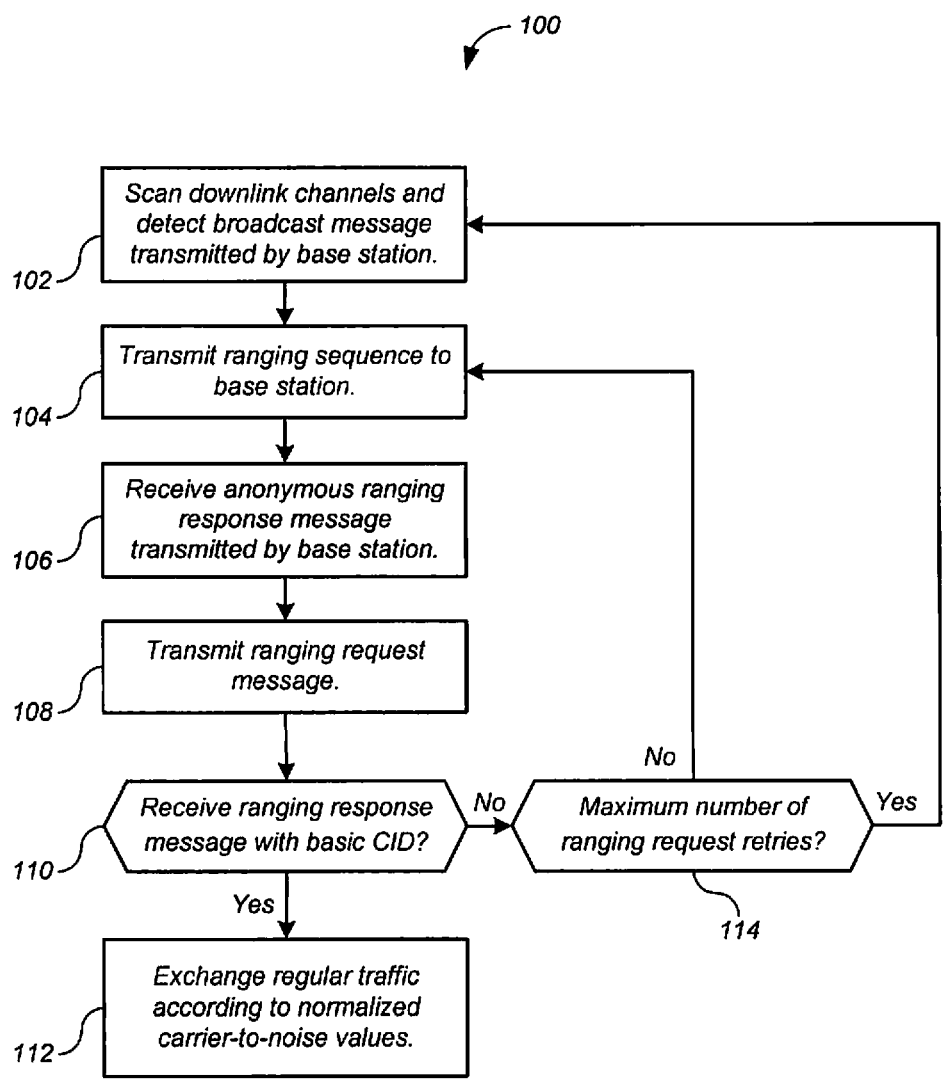
FIG. 1 shows a prior art process for a mobile device to establish an initial connection with a WiMAX base station.

The leading digit(s) of each reference numeral used in this specification indicates the number of the drawing in which the reference numeral first appears.

DETAILED DESCRIPTION

Figure 2:
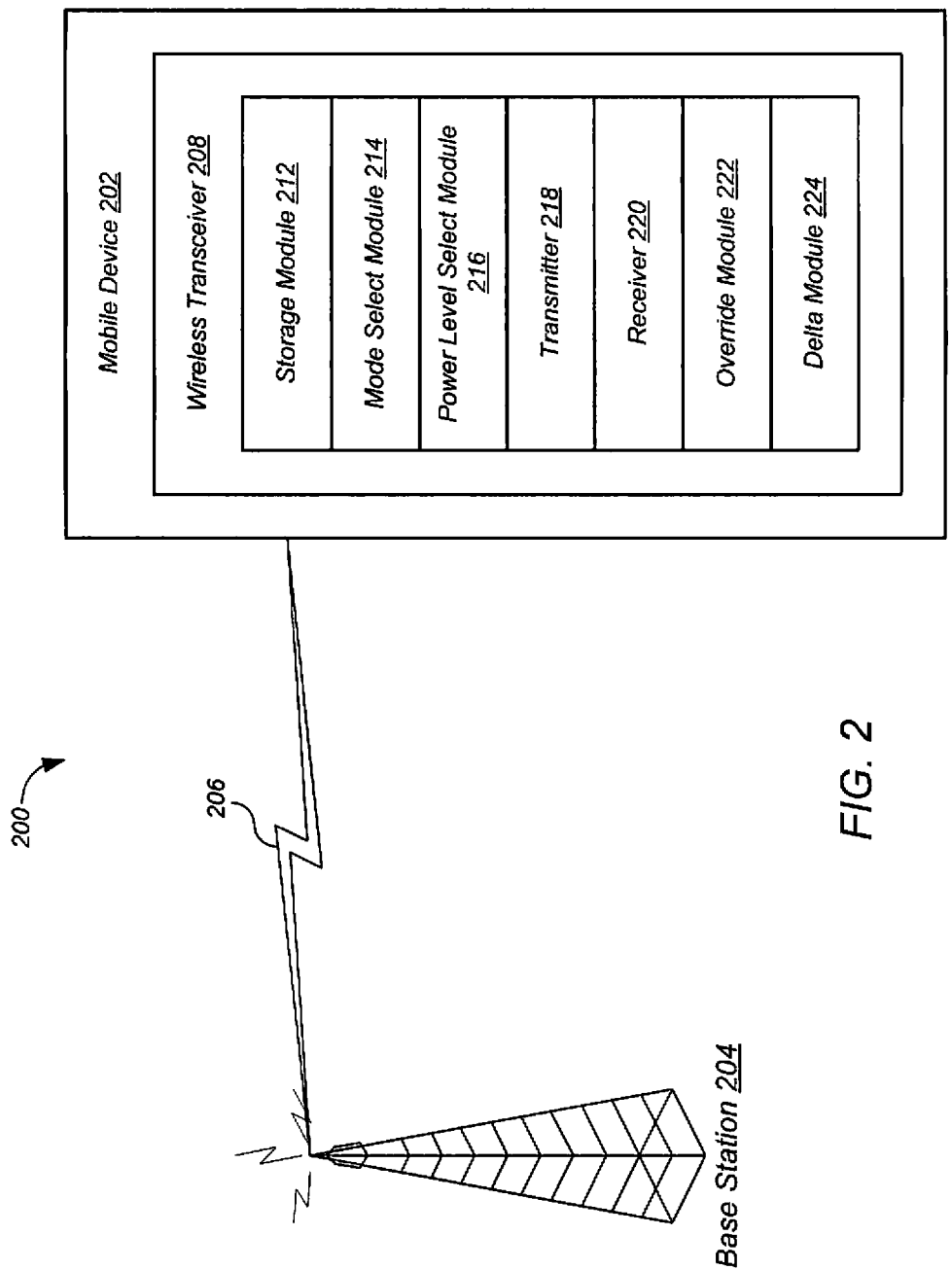
FIG. 2 shows elements of a communication system comprising a mobile device and a base station according to some embodiments.

FIG. 2 shows elements of a communication system 200 comprising a mobile device 202 and a base station 204 according to some embodiments. Although in the described embodiments, the elements of communication system 200 are presented in one arrangement, other embodiments may feature other arrangements, as will be apparent to one skilled in the relevant arts based on the disclosure and teachings provided herein. For example, elements of communication system 200 can be implemented in hardware, software, or combinations thereof.

In the disclosed embodiments, mobile device 202 and base station 204 communicate by exchanging wireless signals 206 in accordance with the WiMAX protocol specified by IEEE standard 802.16, including draft and approved amendments. However, in other embodiments, other similar protocols can be employed instead, as will be apparent after reading this disclosure.

Referring to FIG. 2, mobile device 202 includes a wireless transceiver 208. Wireless transceiver 208 includes a storage module 212 to store a respective normalized carrier-to-noise value for each of a plurality of modulation modes. For example, storage module 212 can store Table 1 above. Wireless transceiver 208 further includes a mode select module 214 to select the modulation modes, a power level select module 216 to select power levels according to the normalized carrier-to-noise values for the selected modes, a transmitter 218, a receiver 220, an override module 222 to increase the stored normalized carrier-to-noise values by a predetermined amount, and a delta module 224 to select the predetermined amount.

Figure 3A:
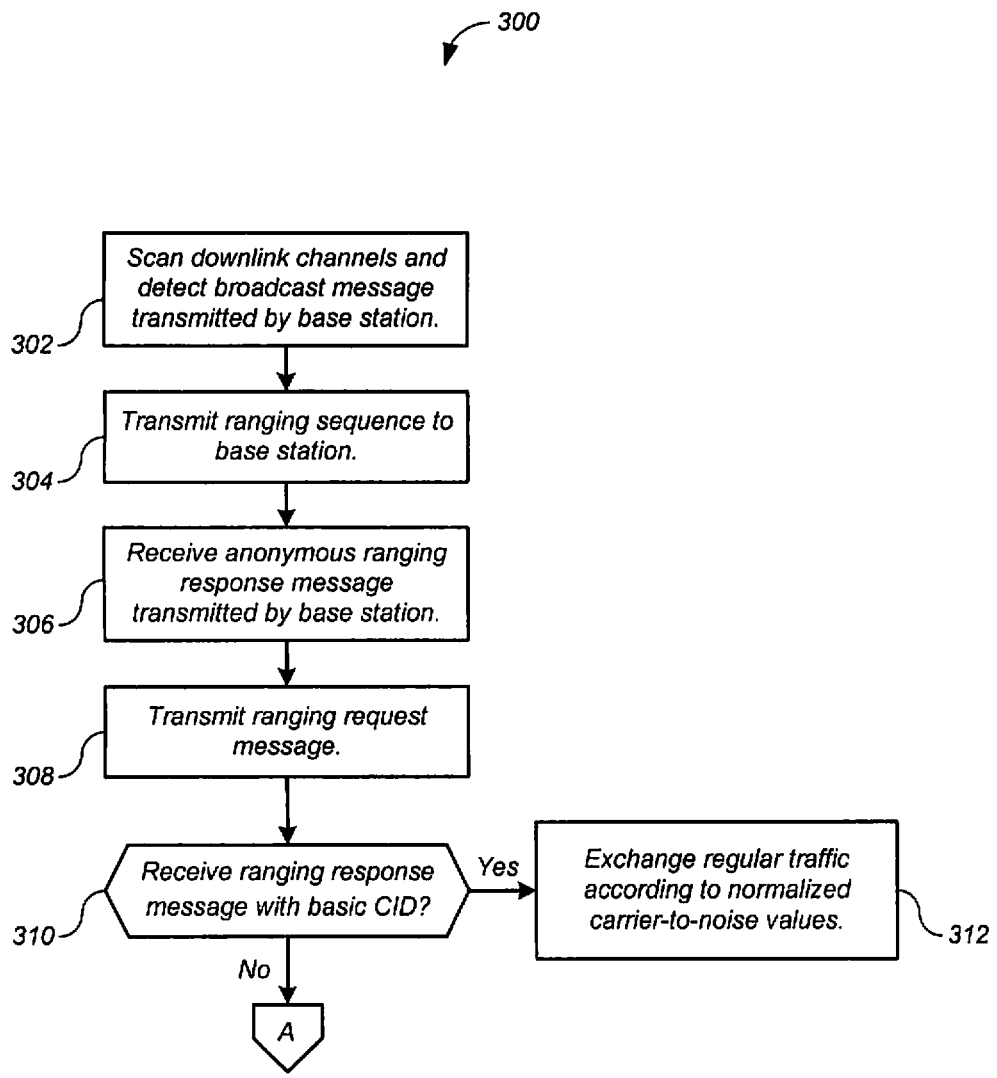
FIGS. 3A and 3B shows a process for the mobile device of FIG. 2 to establish an initial connection with the base station of FIG. 2 according to some embodiments.
Figure 3B:
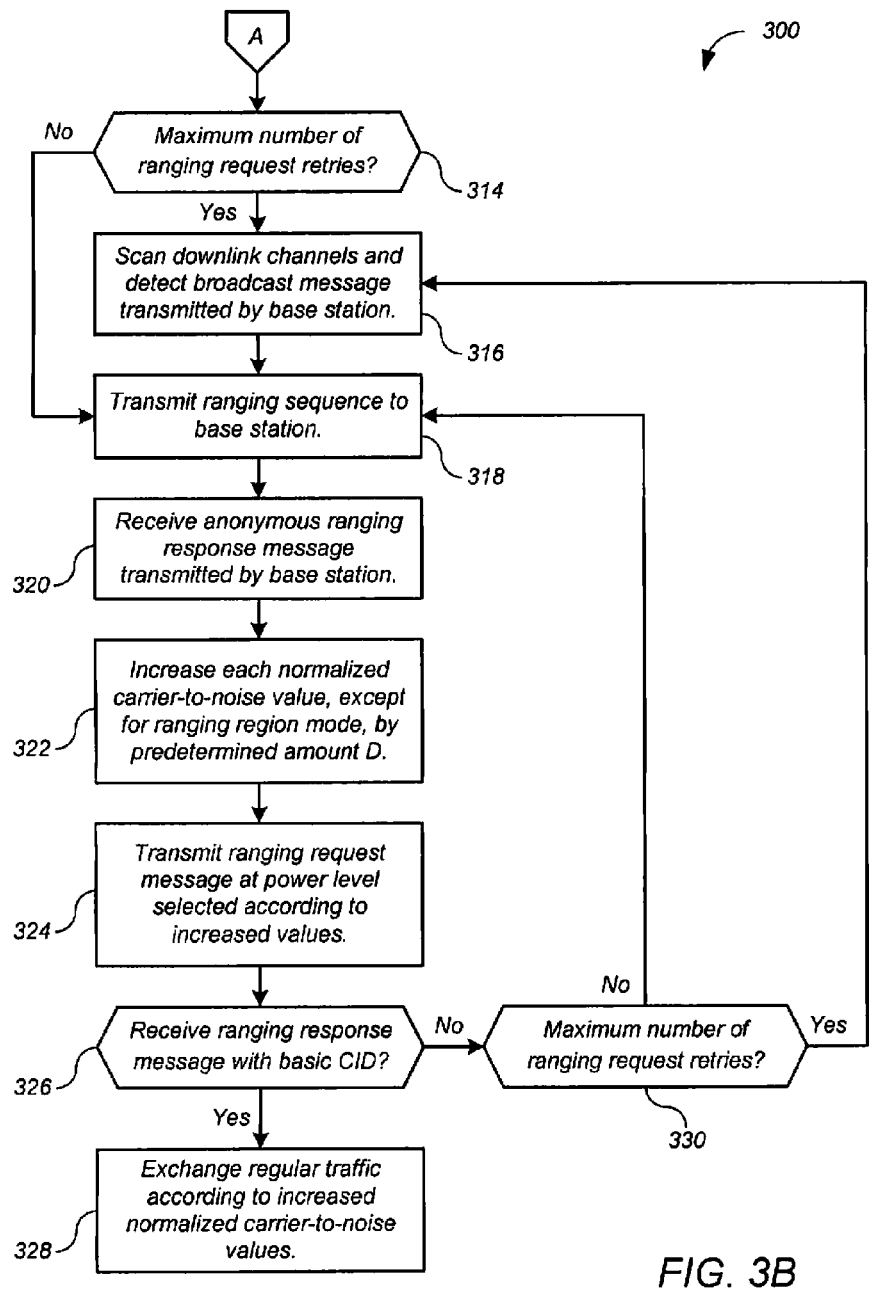

FIGS. 3A and 3B shows a process 300 for mobile device 202 of FIG. 2 to establish an initial connection with base station 204 of FIG. 2 according to some embodiments. Although in the described embodiments, the elements of process 300 are presented in one arrangement, other embodiments may feature other arrangements, as will be apparent to one skilled in the relevant arts based on the disclosure and teachings provided herein. For example, in various embodiments, some or all of the steps of process 300 can be executed in a different order, concurrently, and the like.

Referring to FIGS. 3A and 3B, base station 204 transmits a broadcast message containing information identifying the base station and other network information. After detecting the broadcast message (step 302), transmitter 218 of mobile device 202 transmits a ranging sequence to base station 204 (step 304). Transmitter 218 can transmit the ranging sequence at some power level and store that power level for future reference. In WiMAX, the modulation mode generally employed for the transmission of the ranging sequence is code division multiple access (CDMA).

Base station 204 responds with an anonymous ranging response message. After receiving the anonymous ranging response message (step 306), transmitter 218 of mobile device 202 can transmit a ranging request message (step 308). Transmitter 218 of mobile device 202 can transmit the ranging request message at a power level selected by power level select module 216 according to the "QPSK ½" entry in Table 1, which specifies a C/N value of 6 dB, which is 3 dB higher than the value of the "Ranging region" entry. In WiMAX, the modulation mode generally employed for the transmission of the ranging request message is quadrature phase-shift keying (QPSK) with code rate ½.

In response, base station 204 transmits a ranging response message with basic CID. If mobile device 202 receives the ranging response message with basic CID (step 310), then mobile device 202 can begin exchanging regular traffic according to the modulation modes and normalized carrier-to-noise values of Table 1 (step 312).

However, if mobile device 202 does not receive the ranging response message with basic CID within a specified interval (step 310), mobile device 202 repeats transmission of the ranging sequence and ranging request message, in order (steps 314 and 318). After a predetermined number of attempts with no response (step 314) the mobile station scans downlink channels and detects a broadcast message transmitted by the base station (step 316) before transmitting the ranging sequence (step 318).

After receiving an anonymous ranging message transmitted by the base station (step 320), override module 222 increases each of the normalized carrier-to-noise values stored in storage module 212, except the normalized carrier-to-noise value for the "Ranging region" modulation mode, by a predetermined amount D (step 322). The resulting table is shown as Table 2 below. Then mobile device 202 transmits the ranging request message at a power level selected by power level select module 216 according to Table 2 (step 324), for example according to the "QPSK ½" entry, which now specifies a C/N value of 6+D dB, thus 3+D dB higher than the "Ranging region" entry.

TABLE 2

| Modulation/FEC rate | Normalized C/N (dB) |
| --- | --- |
| ACK region | −3 + D |
| Fast-feedback | 0 + D |
| Ranging region | 3 |
| QPSK 1/3 | 0.5 + D |
| QPSK 1/2 | 6 + D |
| QPSK 2/3 | 7.5 + D |
| QPSK 3/4 | 9 + D |
| Sounding | 9 + D |
| 16-QAM 1/2 | 12 + D |
| 16-QAM 2/3 | 14.5 + D |
| 16-QAM 3/4 | 15 + D |
| 16-QAM 5/6 | 17.5 + D |
| 64-QAM 1/2 | 18 + D |
| 64-QAM 2/3 | 20 + D |
| 64-QAM 3/4 | 21 + D |
| 64-QAM 5/6 | 23 + D |

In some embodiments, the predetermined amount D is pre-configured. In other embodiments, delta module 224 selects the predetermined amount D based on factors such as link budget, a function of previous power levels, and the like. Example values for D can be on the order of 1 dB. Of course, other values of D can be used instead.

If mobile device 202 receives a ranging response message with basic CID within a predetermined interval subsequent to re-transmission of the ranging request message at increased power (step 326), mobile device 202 uses the modified normalized carrier-to-noise values for subsequent transmissions (step 328). In particular, mode select module 214 selects a modulation mode for one or more transmissions. Power level select module 216 then selects a power level according to the increased normalized carrier-to-noise value stored in storage module 212 for the selected modulation mode. Power level select module 216 can employ these increased normalized carrier-to-noise values in power control equations for both open-loop and closed-loop power control. Transmitter 218 then transmits one or more messages using the selected modulation mode and the selected power level.

However, if mobile device 202 does not receive a ranging response message within a specified interval subsequent to transmission of the ranging request message (step 326), mobile device 202 can transmit the ranging sequence (step 318). After a predetermined number of attempts with no response (step 330) mobile station 202 can return to scanning downlink channels (step 316).

Various embodiments can be implemented in digital electronic circuitry, or in computer hardware, firmware, software, or in combinations of them. Embodiments can be implemented in a computer program product tangibly embodied in a machine-readable storage device for execution by a programmable processor; and method steps can be performed by a programmable processor executing a program of instructions to perform functions by operating on input data and generating output. Embodiments can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, it will be understood that various modifications may be made without departing from the scope of the disclosure. Accordingly, other implementations are within the scope of the following claims.

What is claimed is:

1. A method comprising:
   transmitting a ranging sequence, modulated according to a first modulation mode at a first power level, from a transceiver of a mobile station to establish a connection with a base station, wherein the first power level is selected based on a first normalized carrier-to-noise value associated with the first modulation mode in a table, and wherein the table is stored in the mobile station and includes a plurality of normalized carrier-to-noise values with respective modulation modes;
   transmitting a first ranging request message to the base station according to a second modulation mode at a second power level, wherein the second power level is selected based on a second normalized carrier-to-noise value associated with the second modulation mode in the table, wherein the first ranging request message is transmitted subsequent to receiving a ranging response message from the base station, and wherein the ranging response message is received in response to the ranging sequence; and
   in response to the transceiver not receiving a response to the first ranging request message within a predetermined interval from the transmission of the first ranging request message to the base station, increasing each of the plurality of normalized carrier-to-noise values in the table by a predetermined amount except the first normalized carrier-to-noise value associated with the first modulation mode.

2. The method of claim 1, further comprising:
   selecting power levels, other than the first power level, for a plurality of messages based on respective ones of the plurality of normalized carrier-to-noise values; and
   subsequent to transmitting the first ranging request message, transmitting each of the plurality of messages at a respective one of the selected power levels.

3. The method of claim 2, wherein the transmitting of the plurality of messages comprises transmitting a second ranging request message according to the second modulation mode and at a power level selected based on the second normalized carrier-to-noise value associated with the second modulation mode.

4. The method of claim 1, further comprising selecting the predetermined amount based on (i) a function of power levels at which messages have been transmitted from the transceiver to the base station or (ii) a link budget.

5. The method of claim 1, wherein:
   the first modulation mode includes code division multiple access (CDMA); and
   the second modulation mode includes quadrature phase-shift keying (QPSK) modulation.

6. An apparatus comprising:
   a storage module configured to store a normalized carrier-to-noise values for a plurality of modulation modes:
   a mode module configured to select a first modulation mode;
   a power module configured to select a first power level based on a carrier-to-noise value stored in the storage module for the first modulation mode;
   a transmitter configured to transmit a ranging sequence, modulated according to the first modulation mode and at the first power level, from a mobile station to establish a connection with a base station;
   a receiver configured to receive a ranging response message from the base station, wherein the ranging response message is received in response to the ranging sequence;
   wherein, in response to the ranging response message from the base station,
      the mode module is configured to select a second modulation mode,
      the power module is configured to select a second power level based on a carrier-to-noise value stored in the storage module for the second modulation mode, and the transmitter is configured to transmit a first ranging request message to the base station according to the second modulation mode and at the second power level; and an override module configured to, in response to the receiver not receiving a response to the first ranging request message within a predetermined interval from the transmission of the first ranging request message to the base station, increase each of the normalized carrier-to-noise values stored in the storage module by a predetermined amount except the normalized carrier-to-noise value for the first modulation mode.

7. The apparatus of claim 6, wherein:

the power module is configured to select power levels, other than the first power level, for a plurality of messages based on respective ones of the plurality of normalized carrier-to-noise values; and the transmitter is configured to, subsequent to transmitting the first ranging request message, transmit each of the plurality of messages at a respective one of the selected power levels.

8. The apparatus of claim 7, wherein the transmitter is configured to transmit a second ranging request message according to the second modulation mode at the second power level selected based on the normalized carrier-to-noise value associated with the second modulation mode.

9. The apparatus of claim 6, further comprising a delta module configured to select the predetermined amount based on (i) a function of power levels at which messages have been transmitted from the transmitter to the base station or (ii) a link budget.

10. The apparatus of claim 6, wherein:

the first modulation mode includes code division multiple access (CDMA); and the second modulation mode includes quadrature phase-shift keying (QPSK) modulation.

11. A wireless transceiver comprising the apparatus of claim 6.

12. A mobile device comprising the wireless transceiver of claim 11.

13. A non-transitory storage medium configured to store a computer program for a transceiver, wherein the computer program includes instructions executable by a computer, and wherein the instructions comprise:

instructions for causing the transceiver to transmit a ranging sequence, modulated according to a first modulation mode and at a first power level, from a mobile station to establish a connection with a base station, wherein the first power level is selected based on a first normalized carrier-to-noise value associated with the first modulation mode in a table, and wherein the table is stored in the mobile station and includes a plurality of normalized carrier-to-noise values respective modulation modes;

instructions for causing the transceiver to transmit a first ranging request message to the base station according to a second modulation mode at a second power level, wherein the second power level is selected based on a second normalized carrier-to-noise value associated with the second modulation mode in the table, wherein the first ranging request message is transmitted subsequent to receiving a ranging response message from the base station, and wherein the ranging response message is received in response to the ranging sequence; and instructions for, in response to the transceiver not receiving a response to the first ranging request message within a predetermined interval from the transmission of the first ranging request message to the base station, increasing, by a predetermined amount, each of the plurality of normalized carrier-to-noise values in the table except the first normalized carrier-to-noise value associated with the first modulation mode.

14. The computer program of claim 13, wherein the program further comprises instructions for:

selecting power levels, other than the first power level, for a plurality of messages based on respective ones of the plurality of normalized carrier-to-noise values; and causing the transceiver to, subsequent to transmitting the first ranging request message, transmit each of the plurality of messages at a respective one of the selected power levels.

15. The computer program of claim 14, wherein the instructions for causing the transceiver to transmit the plurality of messages comprise instructions for causing the transceiver to transmit a second ranging request message based on the second modulation mode at the second power level selected based on the normalized carrier-to-noise value associated with the second modulation mode.

16. The computer program of claim 13, wherein the program further comprises instructions for selecting the predetermined amount based on (i) a function of power levels at which messages have been transmitted from the transceiver to the base station or (ii) a link budget.

* * * * *